United States Patent
Imamura et al.

(10) Patent No.: US 7,970,069 B2
(45) Date of Patent: Jun. 28, 2011

(54) WIRELESS COMMUNICATION APPARATUS AND WIRELESS COMMUNICATION METHOD

(75) Inventors: Daichi Imamura, Kanagawa (JP); Akihiko Nishio, Kanagawa (JP); Kenichi Kuri, Kanagawa (JP); Kenichi Miyoshi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 719 days.

(21) Appl. No.: 11/996,576

(22) PCT Filed: Jul. 27, 2006

(86) PCT No.: PCT/JP2006/314901
§ 371 (c)(1),
(2), (4) Date: Jan. 23, 2008

(87) PCT Pub. No.: WO2007/013559
PCT Pub. Date: Feb. 1, 2007

(65) Prior Publication Data
US 2008/0310530 A1 Dec. 18, 2008

(30) Foreign Application Priority Data
Jul. 29, 2005 (JP) ................................. 2005-220615

(51) Int. Cl.
*H04K 1/10* (2006.01)
(52) U.S. Cl. ........................................ 375/260; 375/295
(58) Field of Classification Search .................. 375/260, 375/295; 370/208–210
See application file for complete search history.

(56) References Cited

U.S. PATENT DOCUMENTS

| 7,313,174 B2 | 12/2007 | Alard et al. | |
| 2002/0126764 A1 | 9/2002 | Murakami | |
| 2005/0094552 A1 | 5/2005 | Abe | |
| 2005/0276360 A1* | 12/2005 | Fujii et al. | 375/347 |
| 2006/0146867 A1 | 7/2006 | Lee et al. | |
| 2010/0104040 A1* | 4/2010 | Seki | 375/267 |

FOREIGN PATENT DOCUMENTS

| JP | 2003-018117 | 1/2003 |
| JP | 2003-348047 | 12/2003 |
| JP | 2004-048755 | 2/2004 |
| JP | 2004-530319 | 9/2004 |
| JP | 2005-027294 | 1/2005 |
| WO | 2004/056022 | 7/2004 |

OTHER PUBLICATIONS

International Search Report dated Oct. 10, 2006.

* cited by examiner

*Primary Examiner* — Emmanuel Bayard
(74) *Attorney, Agent, or Firm* — Dickinson Wright PLLC

(57) ABSTRACT

A wireless communication apparatus and a wireless communication method wherein even when the permissible delay amount of data is small, the permissible delay thereof can be satisfied. A data type determining part (101) determines whether the delay of transport data or control information should be allowed or not. A pilot signal insertion control part (102) decides, based on pilot insertion interval information and allowable delay information, that a pilot signal is placed adjacently to data that is not allowed to delay. A multiplexing part (106) multiplexes encoded and modulated transport data with the pilot signal generated by a pilot signal generating part (105) in such a manner that realizes the placement decided by the pilot signal insertion control part (102).

6 Claims, 15 Drawing Sheets

WIRELESS COMMUNICATION APPARATUS AND WIRELESS COMMUNICATION METHOD

TECHNICAL FIELD

The present invention relates to a wireless communication apparatus and a wireless communication method for changing pilot signal mapping patterns.

BACKGROUND ART

Radio transmission systems are required to further improve spectrum efficiency and realize high-speed data transmission. The OFDM (Orthogonal Frequency Division Multiplexing) scheme has been considered as one option of communication schemes meeting these demands.

Further, in radio transmission systems, support needs to be provided for various class of QoS (Quality of Service). In particular, support for interactive services such as game, telephone and video conference must realize extremely little communication latency, compared to file transfer and web browsing services.

Given this background, in systems using the OFDM scheme, consideration on the method of improving throughput is made by reducing the amount of pilot signals to estimate channel response and increasing the number of symbols and subcarriers to which user data is assigned.

For example, Patent Document 1 discloses setting the mapping pattern of pilot symbols for estimating channel response so as to be responsive to the variation in channel response according to the time variation and the frequency variation of the channel. In particular, as shown in FIG. 1, for users with respect to whom the time variation of the channel is moderate, the time interval for mapping pilot signals (the symbols illustrated with black symbols in the figure) is set wide, and, on the other hand, as shown in FIG. 2, for users with respect to whom the frequency variation of the channel is moderate, the subcarrier interval for mapping pilot signals is set wide (the symbols illustrated with black symbols in the figure), thereby improving transmission efficiency in either case. That is, as shown in FIG. 3, the pilot symbol mapping pattern for users with respect to whom the time variation and frequency variation of channel response are relatively moderate, is set as shown in FIG. 3.

When receiving processing is performed for the data symbols subject to receiving processing shown in FIG. 3 (shaded symbols in the figure), the channel response estimating method on the receiving side requires performing interpolation processing in the time domain and the frequency domain and estimating channel response at time tn, as explained below.

First, channel response estimation values of OFDM symbols between pilot symbols are calculated in subcarrier fk (k=1, 5, 9). That is, channel response estimation values hk (k=1, 5, 9) of subcarriers f1, f5 and f9 at time tn are calculated by estimating channel response estimation values hk(n−1) and hk(n+1) using pilot signals at time tn−1 and tn+1 and performing linear interpolation for estimated channel response estimation values hk(n−1) and hk(n+1).

Next, the channel response estimation values hk(n) (k=2, 4, 6, 8, 10) for the rest of the subcarriers are calculated, by frequency domain interpolation between channel response estimation values hk(n) (k=3, 7, 11) estimated by pilot signals at time tn and channel response estimation values hk(n) (k=1, 5, 9) estimated by time domain interpolation.

As described above, interpolation processing in the time domain and the frequency domain makes it possible to find the channel response estimation value for each subcarrier at time tn, and data symbols subject to receiving processing are demodulated using calculated channel response estimation values.

Further, in the case of the pilot interval for moderate time variation of channel response shown in FIG. 1, by estimating channel response h(n) and h(n+1) using pilot signals at time tn and tn+1 and linear-interpolating estimated channel response h(n) and h(n+1), channel estimation values that are responsive to the time variation of channel response are found.

Patent Document 1: Japanese Patent Application Laid-Open 2004-530319

DISCLOSURE OF INVENTION

Problems to be Solved by the Invention

However, to perform time domain interpolation processing in the above-described manner, receiving processing cannot be started unless channel response estimation is finished using pilot signals that are mapped after the data symbol subject to receiving processing, which increases the processing time for channel estimation and makes it difficult to realize allowable delay with respect to data that allows little delay.

It is therefore an object of the present invention to provide a radio communication apparatus and a radio communication method that realize allowable delay for data that allows little delay.

Means for Solving the Problem

The radio communication apparatus according to the present invention employs a configuration having: a pilot signal generating section that generates a pilot signal; a data category determining section that determines whether or not data allows delay, according to the data category of transmission data; a pilot insertion control section that maps the pilot signal so as to be adjacent to the data determined not to allow delay; a multiplexing section that multiplexes the pilot signal with the transmission data according to the determined mapping; and a transmitting section that transmits the signal multiplexed by the multiplexing section.

ADVANTAGEOUS EFFECT OF THE INVENTION

According to the present invention, the time required for receiving processing is reduced and the roundtrip delay time is reduced, so that allowable delay can be realized for data that allows little delay.

BEST MODE FOR CARRYING OUT THE INVENTION

Embodiments of the present invention will be described below in detail with reference to the accompanying drawings.

Embodiment 1

Figure 4:
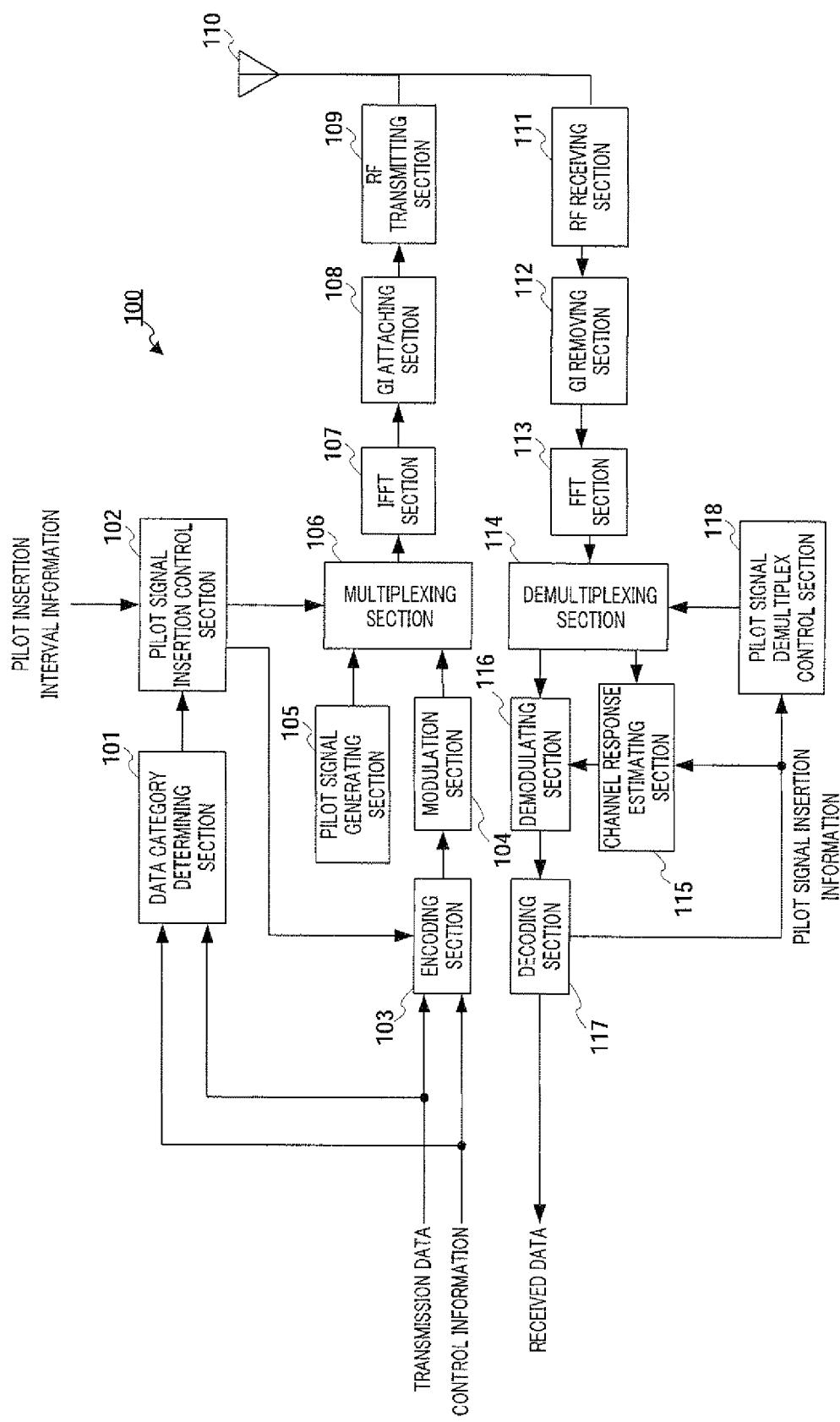
FIG. 4 is a block diagram showing a configuration of a radio communication apparatus according to Embodiment 1 of the present invention.

FIG. 4 is a block diagram showing the configuration of radio communication apparatus 100 according to Embodiment 1 of the present invention. First, in the figure, the transmitting side will be explained.

Data category determining section 101 has a table for determining in advance whether or not delay is allowed according to the category of transmission data and the category of control information. When transmission data or control information is inputted, data category determining section 101 determines whether or not to allow the delay of inputted signals according to the table and outputs information showing whether or not to allow the delay (hereinafter "allowable delay information"), to pilot signal insertion control section 102.

Pilot signal insertion control section 102 acquires information showing the interval for inserting pilot signals (hereinafter "pilot insertion interval information") from, for example, a control section (not shown), determines the arrangement of pilot signals according to obtained pilot signal insertion interval information and the allowable delay information outputted from data category determining section 101, and outputs a control signal to multiplexing section 106, so as to control to map pilot signals in the determined arrangement.

Further, pilot signal insertion control section 102 outputs pilot signal insertion information for reporting the pilot signal mapping patterns to encoding section 103 before transmission data symbol sequence is transmitted so as to report how pilot signals are mapped. Here, pilot signal insertion information is transmitted in the header field or other control channels (for example, control channel for reporting schedule information) with modulation parameters (information required for demodulation such as the modulation scheme and the coding rate) of the transmission data symbol sequence. Pilot signal insertion control section 102 will be described later in detail.

Encoding section 103 performs error correcting coding for the transmission data, the control information and the pilot signal insertion information outputted from pilot signal insertion control section 102, and outputs encoded data sequence to modulation section 104. Modulation section 104 converts the encoded data sequence to modulation symbols such as QPSK modulation symbols, 16 QAM modulation symbols and 64 QAM modulation symbols, and outputs the modulation symbols to multiplexing section 106. Further, pilot signal generating section 105 generates pilot symbols and outputs the generated pilot symbols to multiplexing section 106.

Multiplexing section 106 multiplexes the modulation symbol sequence outputted from modulation section 104 with the pilot symbol outputted from pilot signal generating section 105 according to the control signal outputted from pilot signal insertion control section 102, and outputs the multiplexed signal to IFFT section 107.

IFFT section 107 converts a frequency domain signal to a time domain signal by performing IFFT (Inverse Fast Fourier Transform) processing for the multiplexed signal outputted from multiplexing section 106.

That is, the multiplexed signal is mapped to a plurality of orthogonal subcarriers. The signal after IFFT processing is outputted to GI attaching section 108.

GI attaching section 108 attaches a GI (Guard Interval) to the signal outputted from IFFT section 107 and outputs the signal with a GI to RF transmitting section 109. By attaching a GI, it is possible to reduce ISI (Inter Symbol Interference) by delay waves.

RF transmitting section 109 performs transmitting processing such as D/A conversion and quadrature modulation (up-conversion) for the signal outputted from GI attaching section 108 and transmits the signal after transmitting processing using antenna 110.

Next, the receiving side will be explained. RF receiving section 111 performs predetermined receiving processing such as quadrature detection (down-conversion) and A/D conversion on a signal transmitted from the communicating party and received by antenna 110, and outputs the signal after receiving processing to GI removing section 112. GI removing section 112 removes the GI of the signal outputted from RF receiving section 111 and outputs the signal after the removal to FFT section 113. FFT section 113 converts the time domain signal to the frequency domain signal by performing Fast Fourier Transform (FFT) processing for the signal outputted from GI removing section 112 and outputs the signal after FFT, to demultiplexing section 114.

Demultiplexing section 114 demultiplexes the signal outputted from FFT section 113 to pilot symbols and data symbols according to the control signal outputted from pilot signal demultiplex control section 118 which will be described later, outputs the pilot symbols to channel response estimating section 115 and outputs the data symbols to demodulation section 116.

Channel response estimating section 115 recognizes the mapping pattern of the pilot symbols outputted from demultiplexing section 114 in advance, estimates channel response using the pilot symbols based on pilot signal insertion information outputted from decoding section 117, which will be described later, and outputs a channel response estimation value to demodulation section 116.

Demodulation section 116 compensates the channel distortion of the data symbol outputted from demultiplexing section 114 using the channel response estimation value outputted from channel response estimating section 115, and performs signal point (constellation point) decision by hard decision or soft decision. The signal point decision result is outputted to decoding section 117.

Decoding section 117 performs error correcting processing for the signal point decision result outputted from demodulation section 116 and outputs received data. Further, decoding section 117 outputs pilot signal insertion information included in the received data to channel response estimating section 115 and pilot signal demultiplex control section 118, respectively.

Pilot signal demultiplex control section 118 outputs to demultiplexing section 114 a control signal for demultiplexing the pilot signal from the received data, according to the pilot signal insertion information outputted from decoding section 117.

Figure 5:
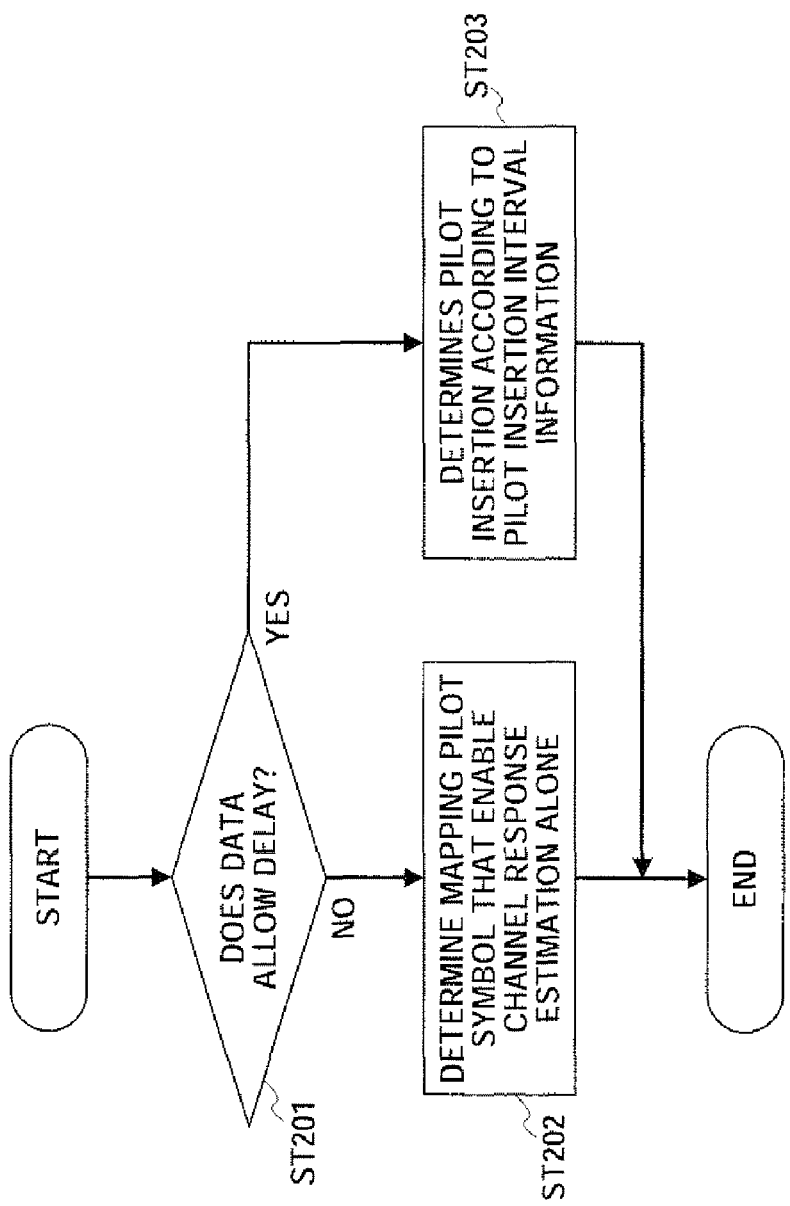
FIG. 5 is a flowchart showing an operation of a pilot signal insertion control section shown in FIG. 4.

FIG. 5 illustrates the operation of pilot signal insertion control section 102 on the transmitting side. Pilot signal insertion control section 102 detects pilot insertion timings according to pilot insertion interval information and allowable delay information, and starts performing the processings of step (hereinafter "ST") 201 and later steps in FIG. 5. In step ST 201, whether or not data allows delay is determined according to the pilot insertion timings and decided allowable delay information. If the data is determined not to allow delay ("NO" in ST 201), the flow proceeds to ST 202, and, if the data is determined to allow delay ("YES" in ST 201), the flow proceeds to ST 203.

Here, data that does not allow delay refers to data where the delay of receiving processing influences the round trip time (RTT). That is, if the receiving processing delay of data that does not allow delay increases, the RTT of that data increases. If the receiving processing delay of data that does not allow delay increases, the RTT of other data that do not allow delay increases.

In ST 202, the single pilot symbol that enables channel response estimation alone is determined to be mapped, and a control signal showing the details of the determination is generated.

In ST 203, a pilot insertion is determined according to pilot insertion interval information, and a control signal showing the details of the determination.

Figure 6:
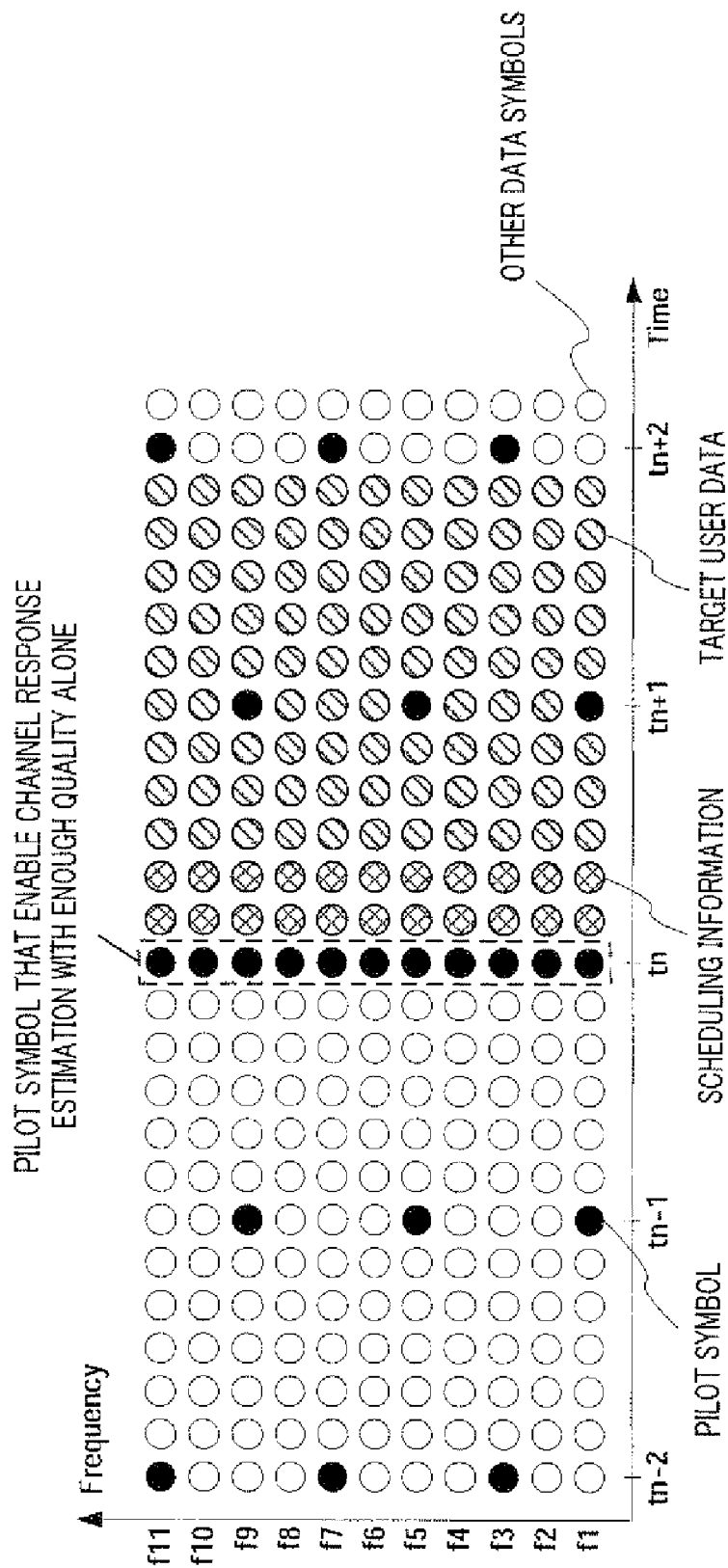
FIG. 6 illustrates OFDM symbol mapping patterns.
Figure 7:
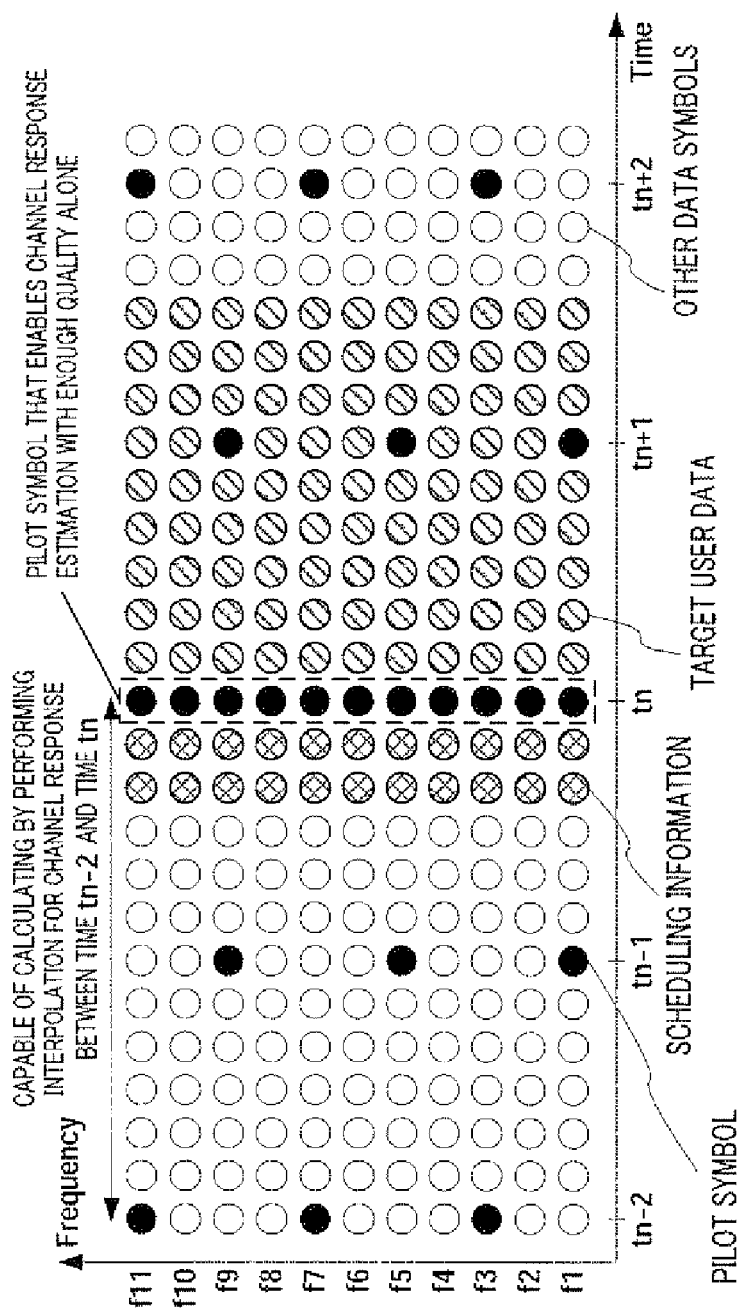
FIG. 7 illustrates OFDM symbol mapping patterns.

Next, the arrangement of pilot symbols determined by pilot signal insertion control section 102 will be explained. FIGS. 6 and 7 illustrate the arrangement of scheduling information as data that does not allow delay (the shaded symbols in the figures), user data corresponding to the scheduling information (the slash symbols in the figures), pilot symbols (the symbols illustrated with black symbols in the figures) and other data symbols (the symbols illustrated with white symbols in the figures).

Here, the scheduling information represents control information transmitted before corresponding user data is transmitted, including information needed for demodulation of accompanying user data such as terminal ID, modulation scheme, coding rate and a data block size. To demodulate the following user data, scheduling information needs to be demodulated before user data. In particular, the control information refers to, for example, the shared control channel (HS-SCCH) described in 3GGP TS 25.212-590.

As shown in FIGS. 6 and 7, pilot signal insertion control section 102 determines the arrangement of the pilot signal that enables channel response estimation in the OFDM symbol (at time $t_n$) adjacent to scheduling information.

Demodulation processing for scheduling information can be performed using the channel response estimation value acquired from the pilot symbol at time tn by mapping the pilot symbol as described above, so that it is possible to reduce time required for demodulating scheduling information.

However, as shown in FIG. 7, when the pilot symbol is mapped after scheduling information, it is possible to estimate channel response per OFDM symbol to which scheduling information is mapped, by performing time domain interpolation processing using this pilot symbol and pilot symbols that have been received earlier (at $time_{m-2}$ and $time_{m-1}$).

Figure 8:
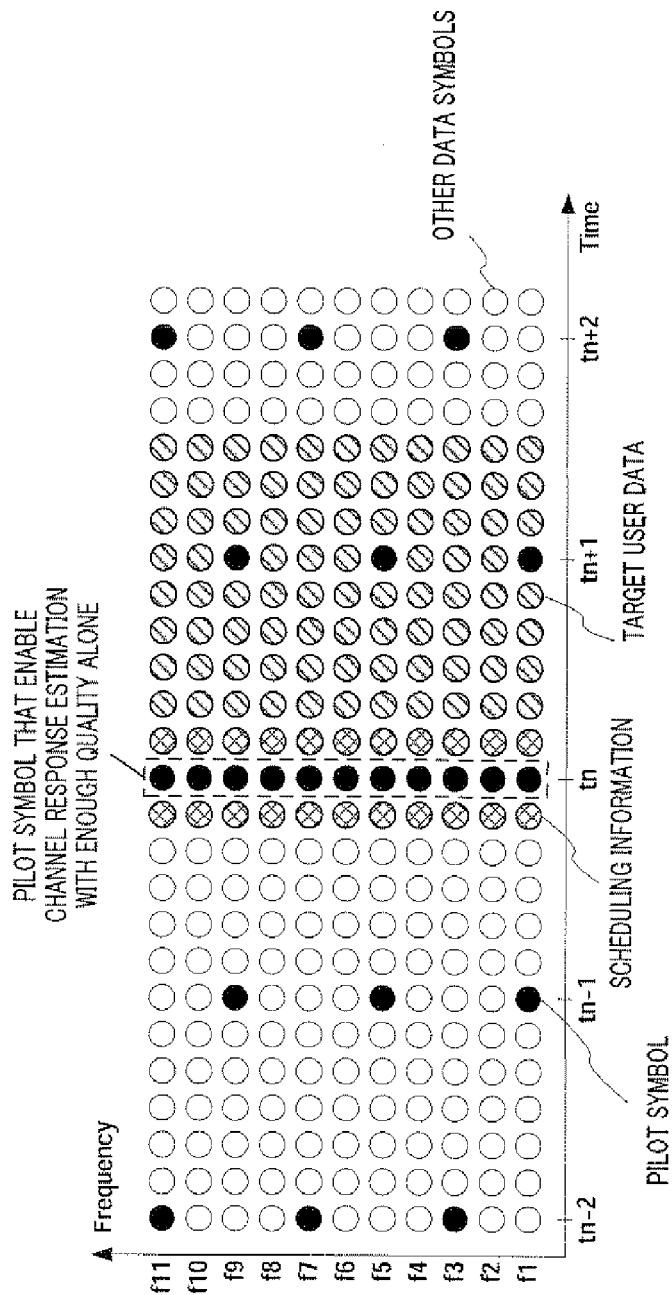
FIG. 8 illustrates OFDM symbol mapping patterns.

Further, as shown in FIG. 8, pilot signal insertion control section 102 may determine the arrangement of pilot signals that enables channel response estimation so as to be mapped in OFDM symbols (at time tn) between scheduling information.

Next, the operation of channel response estimating section 115 on the receiving side shown in FIG. 4 will be explained. First, channel response estimating section 115 acquires pilot signal insertion information, which has been transmitted from the communicating party from demodulated data to data symbol sequence in advance, and changes channel response estimation processing based on pilot signal insertion information.

Figure 3:
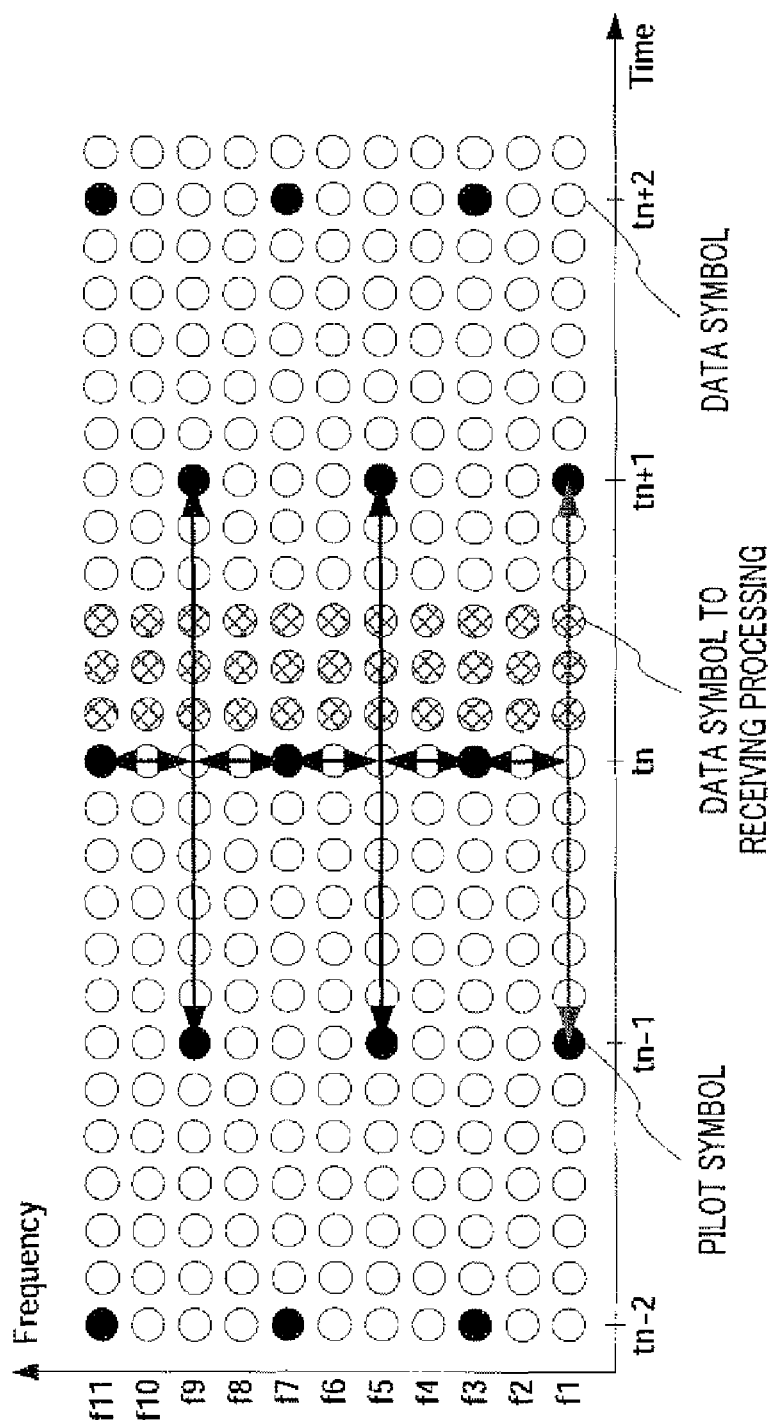
FIG. 3 illustrates how a channel response estimation value is interpolated in the time domain and the frequency domain.

As shown in FIG. 3, when pilot signals are mapped sparsely in the time domain and in the frequency domain, channel response estimating section 115 estimates channel response using the mapped pilot signals and performs frequency domain interpolation processing for the estimated channel response estimation value. Further, by performing interpolation processing for the channel response estimation value of each subcarrier calculated by time domain interpolation, the channel response estimation value is calculated for each frequency and each time. Interpolation processing may be started in the time domain or interpolation processing may be performed in two dimensions for time and frequency.

Further, as shown in FIGS. 6 and 7, if an additional pilot is mapped in the frequency domain, channel response estimating section 115 estimates channel response per subcarrier using the pilot symbol at the time at which the additional pilot is mapped.

As described above, according to Embodiment 1, by mapping pilot signals that enable channel response estimation alone in the OFDM symbol adjacent to data that does not allow delay in the time domain, it is possible to improve the accuracy of channel estimation and reduce the processing time required for channel response estimation.

Although a case has been described with the present embodiment where pilot signals are mapped so as to be adjacent to data that does not allow delay, the amount of pilot signals that enable channel response estimation alone may be set by replacing part of data signals with pilot signals.

Figure 9:
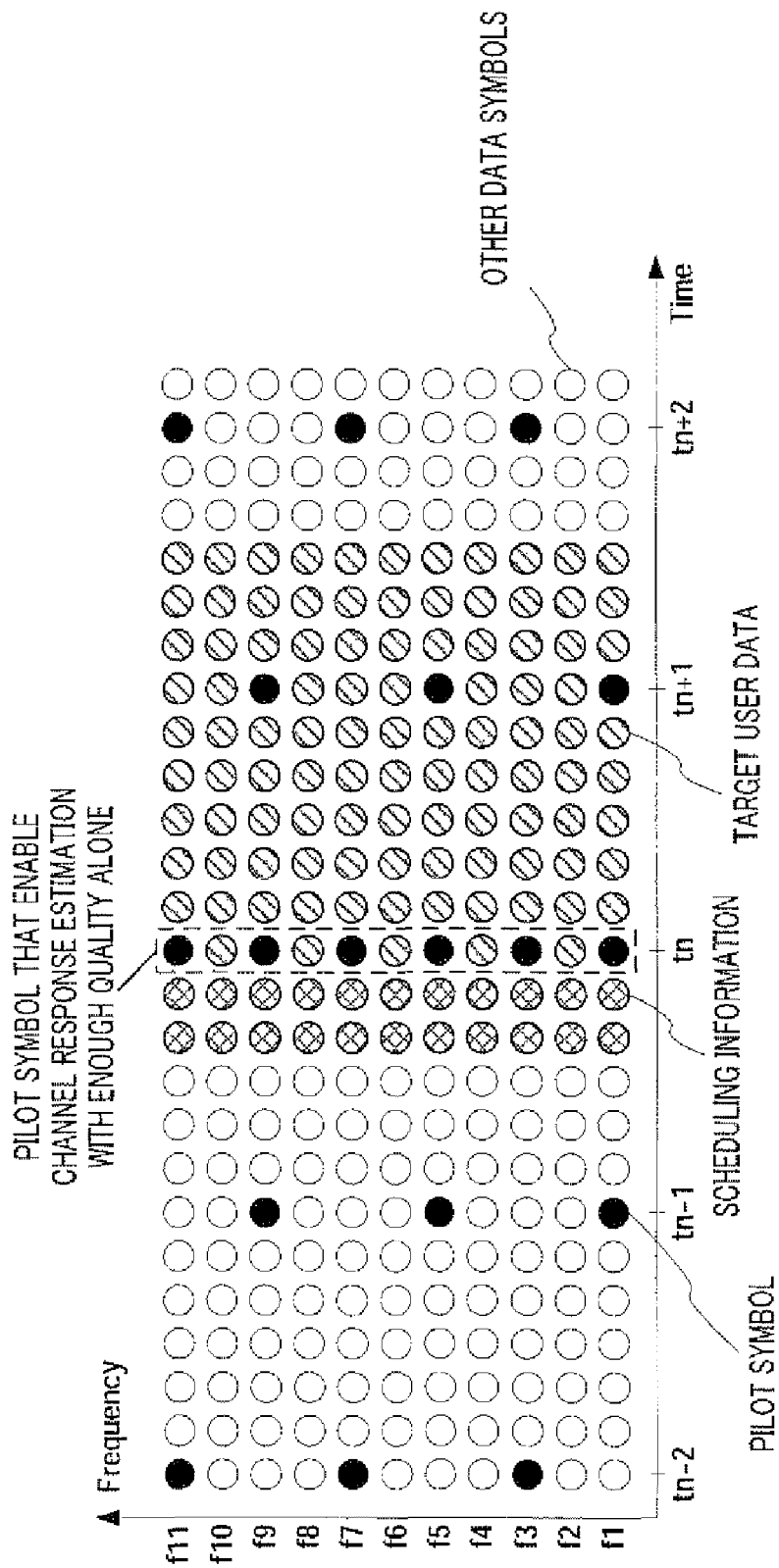
FIG. 9 illustrates OFDM symbol mapping patterns.

Further, although a case has been described with the present embodiment where pilot signals are mapped to all subcarriers in OFDM symbols adjacent to data that does not allow delay as shown in FIGS. 6 to 8, pilot signals may be mapped to subcarriers of part of OFDM symbols adjacent to data that does not allow delay, and user data may be mapped to the rest of the subcarriers as shown in FIG. 9, if the frequency variation of channel response is moderate.

Further, although a case has been described with the present embodiment where pilot signal insertion information is transmitted in the header field of transmission data symbol sequence or other control channels, service category information of transmission data may be reported when whether or not there are additional pilots is determined in advance according to the category of transmission data or the category of control information. In this case, it is possible to determine whether or not there are additional pilots on the receiving side without transmitting pilot signal insertion information.

Further, in the FDMA system in which different subcarriers are assigned to a plurality of communicating parties at the same time, the present embodiment may be applied to each subcarrier assigned to the communicating party.

Embodiment 2

The radio communication apparatus according to Embodiment 2 of the present invention has the same components as FIG. 4 of Embodiment 1 and explanations thereof will be performed with reference to FIG. 4.

Figure 10:
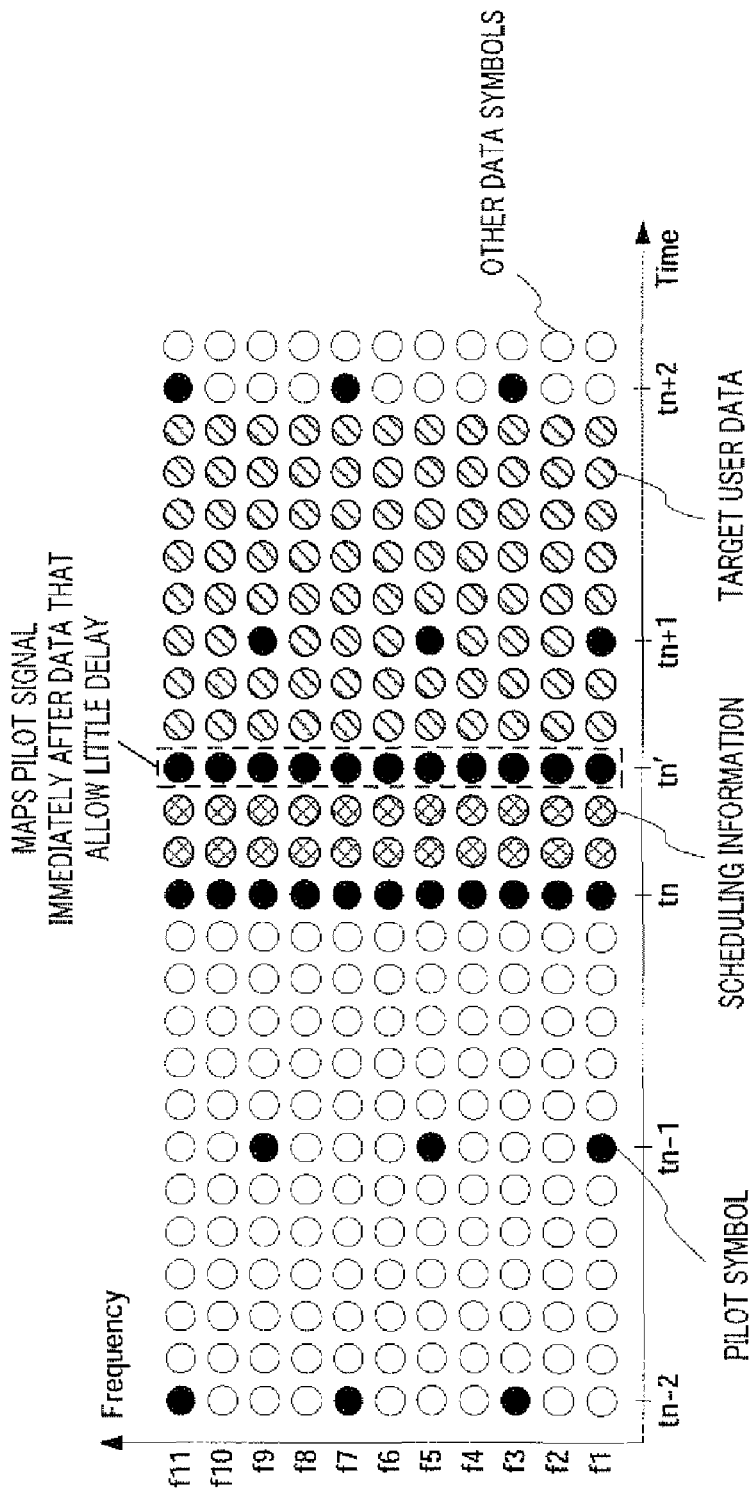
FIG. 10 illustrates OFDM symbol mapping patterns.
Figure 11:
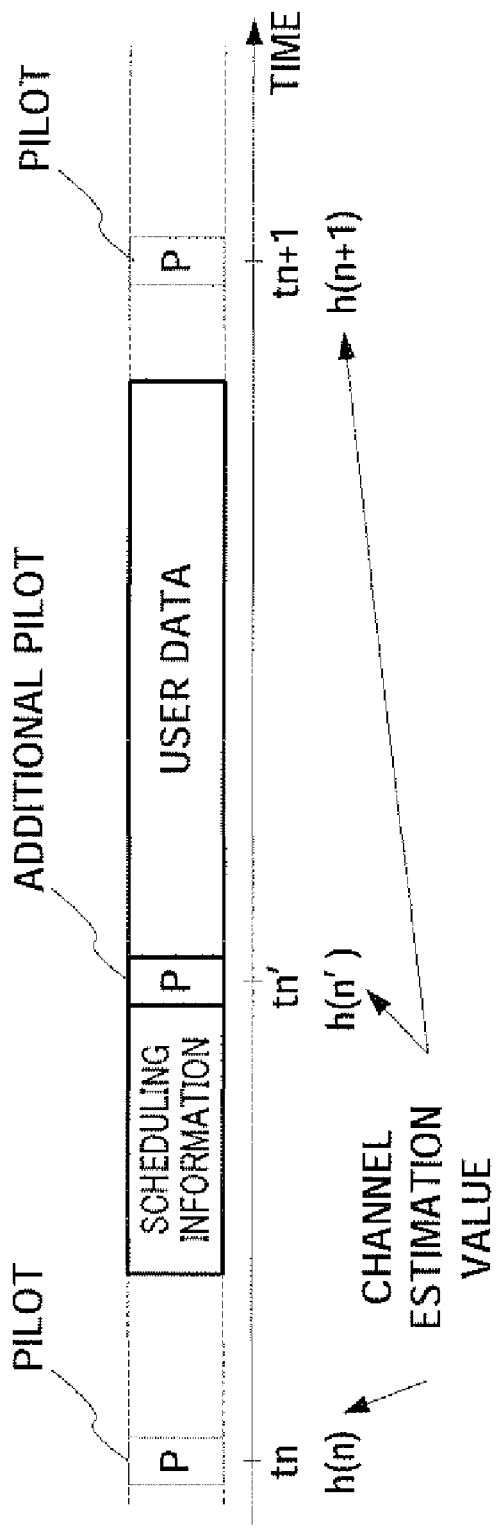
FIG. 11 illustrates pilot signal mapping patterns in a single carrier transmission scheme.

As shown in FIG. 10, pilot signal insertion control section 102 maps pilot signals that enable channel response estimation immediately before scheduling information (at time tn) and immediately after the OFDM symbol (at time tn').

By mapping pilot symbols as described above, when the pilot signal is received at time tn', time domain interpolation processing can be started for the channel response estimation value acquired from pilot symbols at time tn' and time tn, so that it is possible to reduce time required for demodulating scheduling information and be responsive to the time variation of channel response with scheduling information.

Thus, according to Embodiment 2, by mapping pilot signals that enable channel response estimation alone to OFDM symbols immediately before and immediately after data that does not allow delay in the time domain, and by performing time domain interpolation processing for channel response estimation values estimated by the pilot signals, it is possible to reduce time required for channel response estimation and be responsive to the time variation in channel response of the data that allow little delay.

Figure 1:
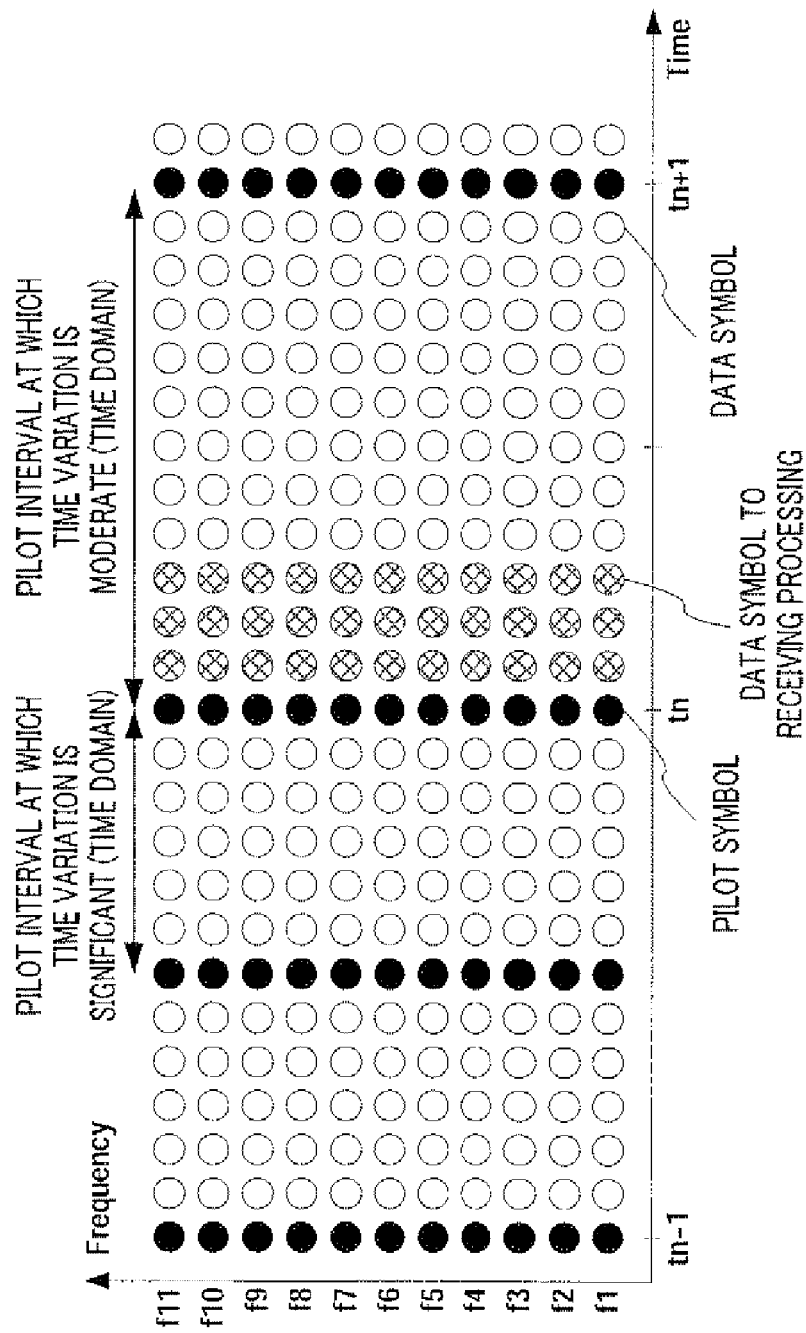
FIG. 1 illustrates how the pilot interval in the time domain is controlled with respect to the time variation of channel.
Figure 2:
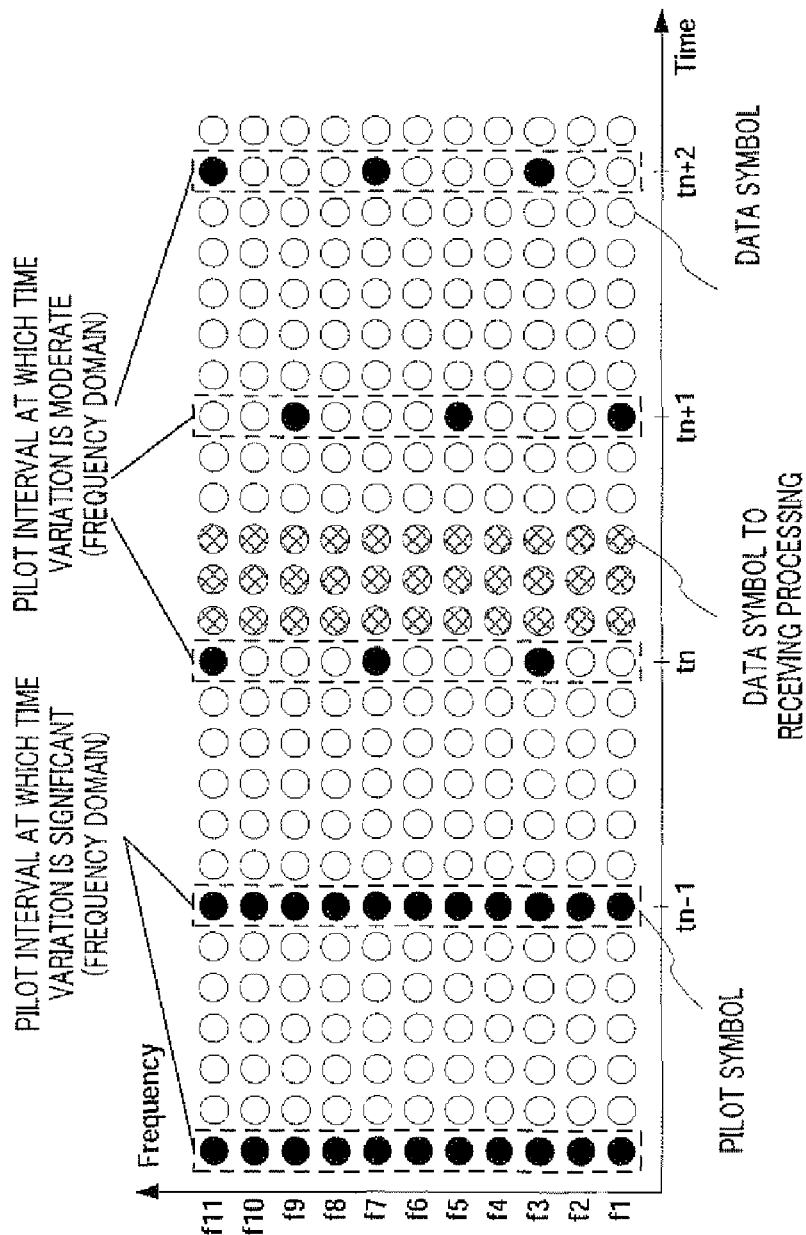
FIG. 2 illustrates how the pilot interval in the frequency domain is controlled with respect to the frequency variation of channel.

Although a case has been described with the present embodiment where the OFDM scheme is used, a single carrier transmission scheme may be used. In this case, additional pilots will be mapped as shown in FIG. 1.

Further, although a case has been described with the present embodiment where pilot signals are mapped immediately before scheduling information as pilot signals adjacent to scheduling information apart from pilot signals mapped immediately after scheduling information as shown in FIG. 6, pilot signals may be mapped between scheduling information as shown in FIG. 8.

Embodiment 3

Figure 12:
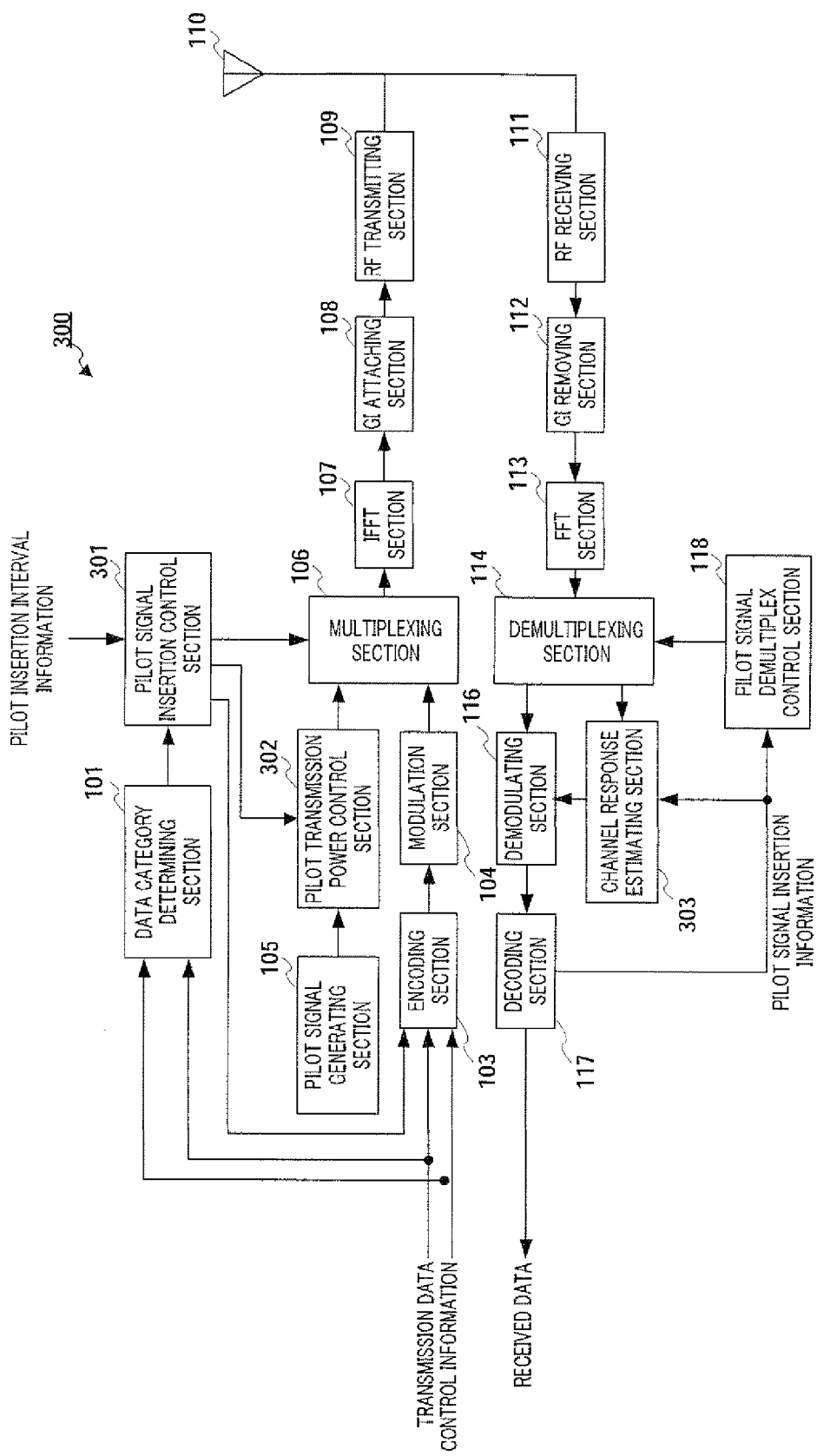
FIG. 12 is a block diagram showing a configuration of a radio communication apparatus according to Embodiment 3 of the present invention.

FIG. 12 is a block diagram showing the configuration of radio communication apparatus 300 according to Embodiment 3 of the present invention. The same components as FIG. 4 of the present invention are assigned the same reference numerals and detailed explanations thereof will be omitted. FIG. 12 is different from FIG. 4 in that pilot transmission power control section 302 is further provided and in that pilot signal insertion control section 102 and channel response estimating section 115 are replaced with pilot signal insertion control section 301 and channel response estimating section 303, respectively.

Pilot signal insertion control section 301 obtains pilot insertion interval information from, for example, a control section (not shown) and outputs a control signal for controlling to map pilot signals, to multiplexing section 106, according to the obtained pilot insertion interval information and allowable delay information outputted from data category determining section 101. Further, pilot signal insertion control section 301 outputs a power control signal for controlling transmission power of a pilot signal to pilot transmission power control section 302. Further, pilot signal insertion control section 301 outputs to encoding section 103 pilot signal insertion information for reporting how pilot signals are multiplexed, reporting whether or not to amplify the transmission power of pilot signals and reporting the amount of amplification when the transmission power is amplified. Here, for example, when whether or not there are additional pilots and whether or not to amplify transmission power are determined according to the category of transmission data and the category of control information in advance, service category information of transmission data may be reported. In this case, it is possible to determine whether or not there are additional pilots and an increment of the transmission power of pilots on the receiving side, without reporting whether or not there are additional pilots and the increment of the transmission power of pilots.

Pilot transmission power control section 302 amplifies the transmission power (amplitude) of the pilot signal outputted from pilot signal generating section 105 according to the power control signal outputted from pilot signal insertion control section 301, and outputs the amplified pilot signal to multiplexing section 106.

Channel response estimating section 303 recognizes pilot symbol mapping patterns outputted from demultiplexing section 114 and whether or not to amplify the transmission power of pilot signals in advance, estimates channel response using pilot symbols according to pilot signal insertion information outputted from decoding section 117, and outputs channel response estimation values to demodulation section 116. In this case, if the transmission power of the pilot signal is amplified, the level (amplitude) of the channel response estimation value estimated by the amplified pilot signal is adjusted in accordance with the amount of amplification to the level (amplitude) of the channel response estimation value estimated by non-amplified pilot signal.

As described above, by amplifying the transmission power of the pilot signal mapped so as to be adjacent to scheduling information, received quality (for example, SNR (Signal to Noise Ratio)) of the amplified pilot signal can be improved and the accuracy of channel response estimation can be improved, so that it is possible to perform demodulation processing for scheduling information without performing averaging processing for ensuring the accuracy of channel response estimation.

Figure 13:
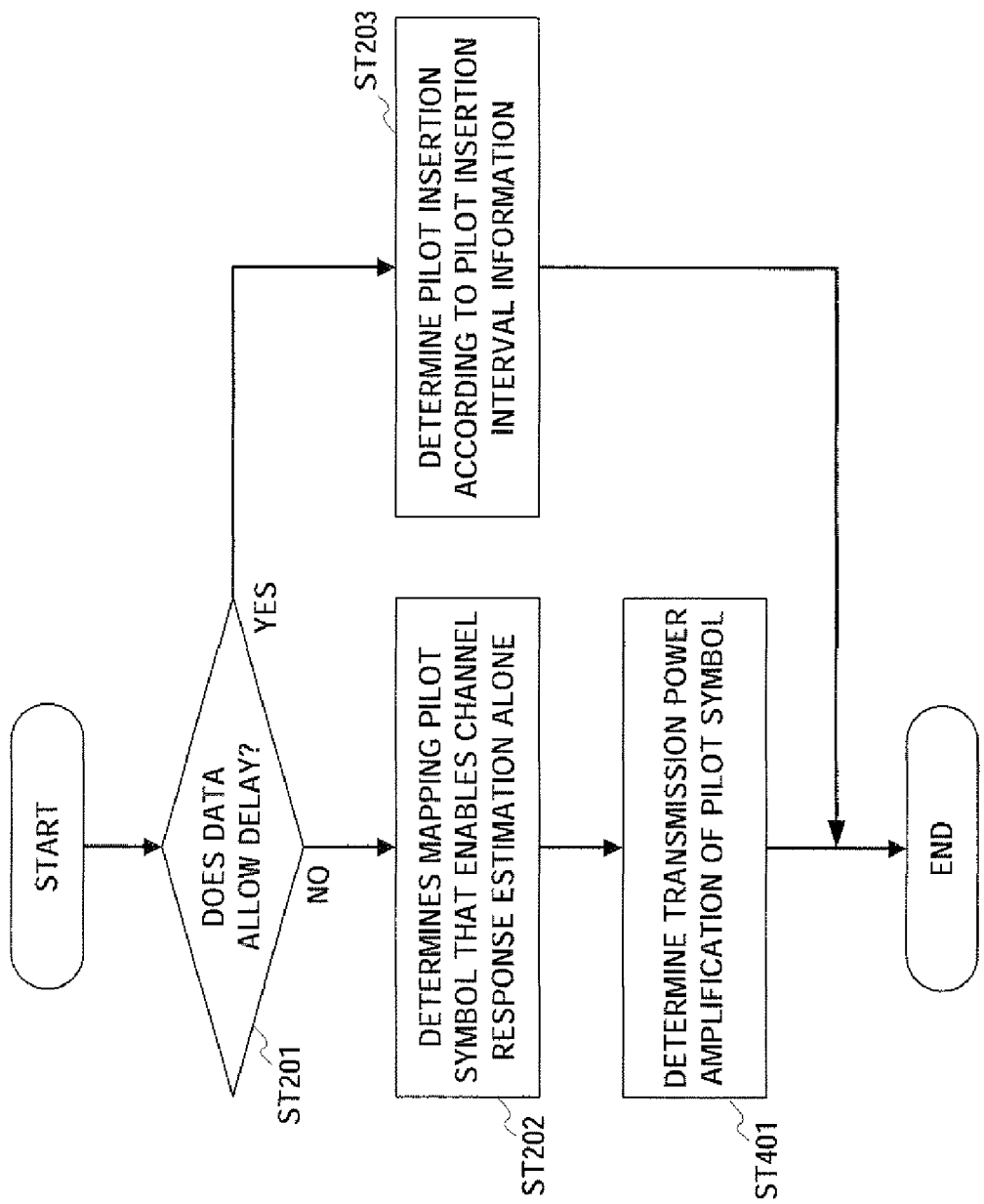
FIG. 13 is a flowchart showing the operation of the pilot signal insertion control section shown in FIG. 12.

FIG. 13 illustrates the operation of pilot signal insertion control section 301 on the transmitting side. The same components as FIG. 5 are assigned the same reference numerals and detailed explanations thereof will be omitted. In ST401 in FIG. 13, the transmission power of the pilot symbol determined to be mapped in ST202 is determined to be amplified, and a control signal showing the details of the determination is generated.

Figure 14:
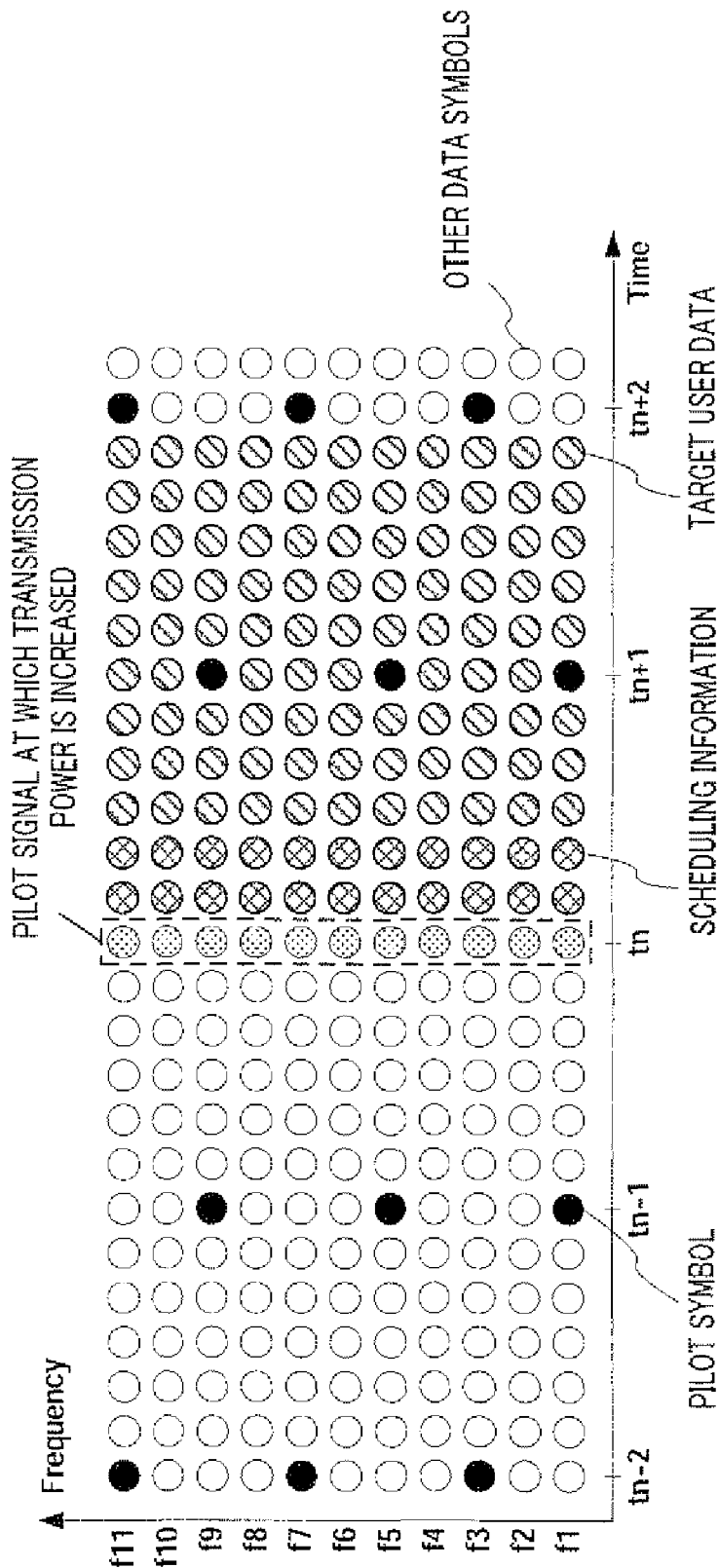
FIG. 14 illustrates a state where pilot symbols are mapped immediately before scheduling information.
Figure 15:
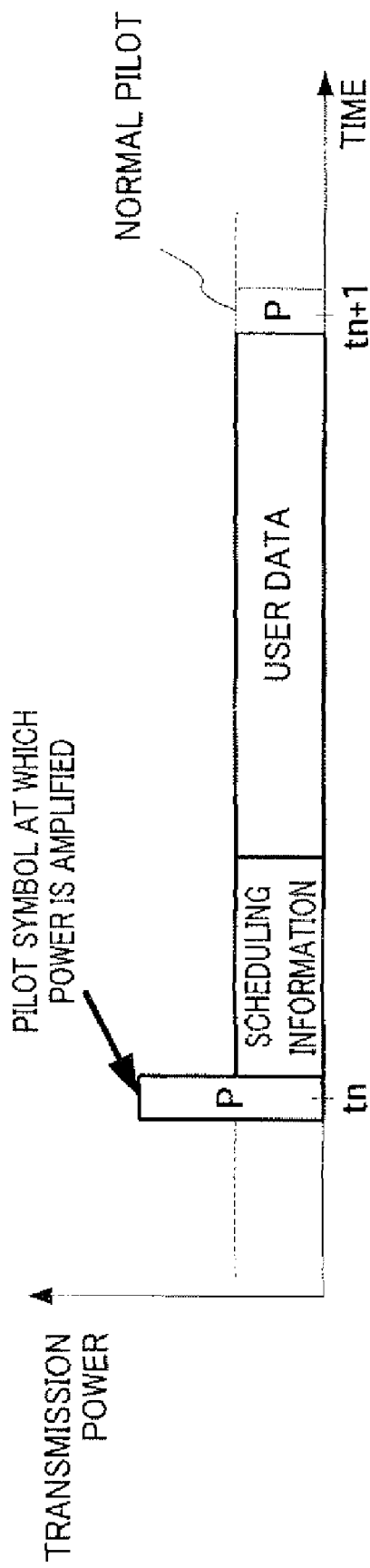
FIG. 15 illustrates a state where the transmission power of pilot symbols, mapped immediately before scheduling information, is amplified.

FIG. 14 illustrates a state where pilot symbols are mapped immediately before scheduling information (the shaded symbols in the figure), and FIG. 15 illustrates a state where the transmission power of pilot symbols, mapped immediately before scheduling information, is amplified.

As described above, according to Embodiment 3, by amplifying the transmission power of the pilot signal mapped so as to be adjacent to data that dose not allow delay, received quality of this pilot signal can be improved, so that it is possible to improve the accuracy of channel response estimation estimated by this pilot signal.

Although a case has been described above with the present embodiment where the transmission power of the pilot signal mapped immediately before scheduling information is amplified as shown in FIG. 6, the transmission power of the mapped pilot signal may be amplified as shown in FIGS. 7 to 11.

Although a case has been described with the above embodiments where scheduling information is explained as data that does not allow delay as an example, the present invention is not limited thereto, and control information, where transmission, reception and retransmission of user data are controlled so as not to perform processing for user data without demodulating these information, that is, control information where RTT of corresponding user data is increased may be applicable when transmitting processing delay, transmission delay and receiving processing delay of control information itself increase, such as ACK/NACK information and CQI (Channel Quality Information or Channel Quality Indicator). Further, data requiring the real time performance of communication such as audio, video and game, or data that allows less delay as a result of repeating retransmission, are also applicable.

Further, although a case has been described with the above embodiments where data category determining section 103 determines whether or not to allow delay, the present invention is not limited thereto, and data category determining section 101 may determine the degree of allowable delay in a plurality of steps and may calculate allowable delay in accordance with data category.

Although a case has been described with the above embodiments as an example where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-220615, filed on Jul. 29, 2005, the entire content of which is expressly incorporated by reference herein.

INDUSTRIAL APPLICABILITY

The radio communication apparatus and the radio communication method according to the present invention has an effect of which allowable delay can be realized for even data that allow little delay, and are applicable to, for example, the OFDM radio communication system.

The invention claimed is:

1. A radio communication apparatus comprising:
   a pilot signal generating section that generates a pilot signal;
   a data category determining section that determines whether or not first data to be transmitted allows delay, according to a data category of the first data to be transmitted;
   a pilot insertion control section that determines a mapping of the pilot signal so as to be adjacent to second data that is determined not to allow delay;
   a multiplexing section that multiplexes the pilot signal with the first data to be transmitted according to the determined mapping, to generate a transmission signal; and
   a transmitting section that transmits the transmission signal.

2. The radio communication apparatus according to claim 1, wherein the pilot insertion control section determines the mapping of the pilot signal so as to increase a density of pilot signals in an orthogonal frequency division multiplex (OFDM) symbol in a frequency domain.

3. The radio communication apparatus according to claim 1, wherein the pilot insertion control section determines the mapping of the pilot signal to all subcarriers in an OFDM symbol.

4. The radio communication apparatus according to claim 1, wherein the pilot insertion control section determines the mapping of the pilot signal immediately after third data that is determined to allow delay.

5. The radio communication apparatus according to claim 1, further comprising an amplifying section that amplifies a transmission power of the pilot signal that is mapped to be adjacent to third data that is determined to allow delay.

6. A radio communication method performed by a radio communication apparatus, the radio communication method comprising:
   multiplexing a pilot signal with first data to be transmitted so as to map the pilot signal to be adjacent to second data that does not allow delay, to generate a transmission signal; and
   transmitting the transmission signal.

* * * * *